United States Patent [19]

Taga et al.

[11] Patent Number: 4,669,562
[45] Date of Patent: Jun. 2, 1987

[54] POWER TAKE-OFF APPARATUS IN AUTOMOTIVE VEHICLE

[75] Inventors: Yutaka Taga; Kunio Morisawa; Toshihiko Uno; Masami Ito; Takashi Haneda, all of Toyota, Japan

[73] Assignee: Toyota Jidosha Kabushiki Kaisha, Toyota, Japan

[21] Appl. No.: 770,584

[22] Filed: Aug. 29, 1985

[30] Foreign Application Priority Data

Aug. 29, 1984 [JP] Japan ................................. 59-180949

[51] Int. Cl.$^4$ ............................................. B60K 27/08
[52] U.S. Cl. ................................................... 180/53.1
[58] Field of Search ..................... 180/53.1, 53.5, 70.1, 180/75.1

[56] References Cited

U.S. PATENT DOCUMENTS

| 3,748,929 | 7/1973 | Green | 180/53.1 |
| 3,958,655 | 5/1976 | Kronogard | 180/53.1 |
| 4,216,840 | 8/1980 | Dick | 180/53.1 |
| 4,317,500 | 3/1982 | Bening | 180/53.1 |

Primary Examiner—Richard A. Bertsch
Attorney, Agent, or Firm—Oblon, Fisher, Spivak, McClelland & Maier

[57] ABSTRACT

A power take-off apparatus in an automotive vehicle equipped with an automatic power transmission including a rotary element arranged to be driven by a prime mover of the vehicle when the transmission is conditioned in a neutral position during stopping of the vehicle and to be arrested when the power transmission is conditioned in a forward position. The power take-off apparatus comprises a drive gear mounted on the rotary element for rotation therewith, a driven gear arranged to be meshed with the drive gear, an electrically operated shift mechanism including an electric motor, and a linkage connected to the motor to move the driven gear toward and away from the drive gear in response to energization of the motor, and an electric control circuit for effecting energization of the motor when the transmission is maintained in the forward position during stopping of the vehicle and for maintaining the motor in its deenergized condition when the transmission is shifted to the neutral position. The linkage of the shift mechanism is provided with resilient means for biasing the driven gear toward the drive gear when the former is engaged with an end face of the latter.

5 Claims, 3 Drawing Figures

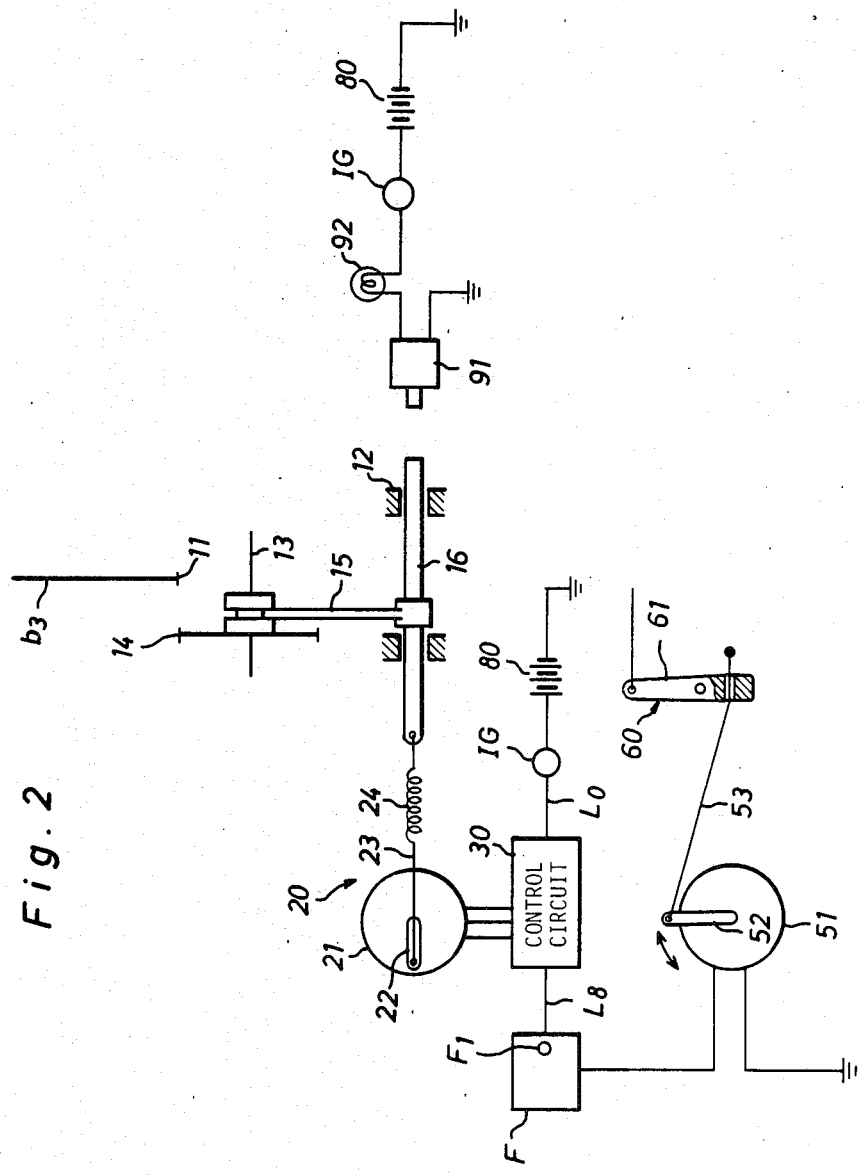

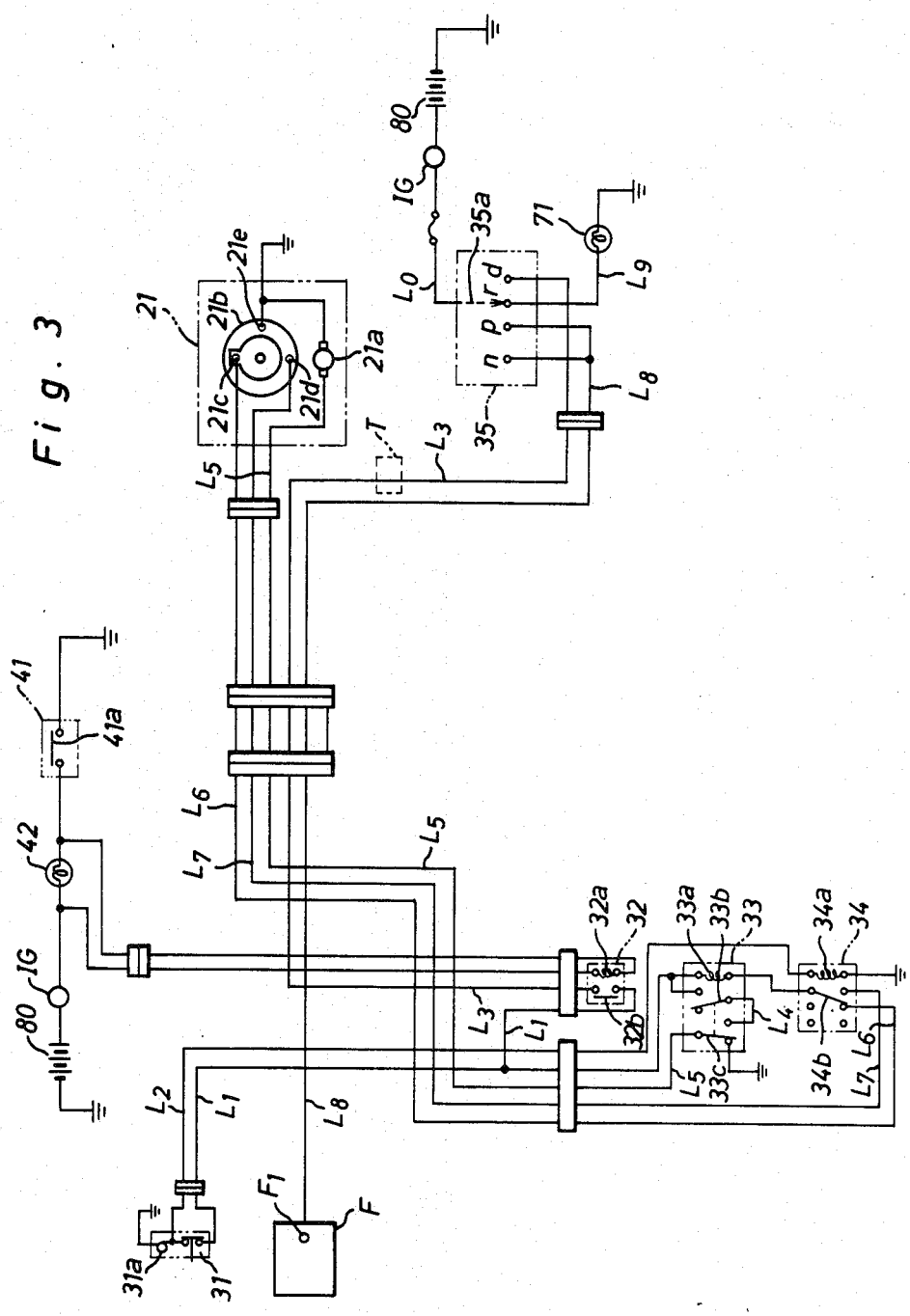

POWER TAKE-OFF APPARATUS IN AUTOMOTIVE VEHICLE

BACKGROUND OF THE INVENTION

The present invention relates to a power take-off apparatus in an automotive vehicle such as a dump truck, a cement mixer truck, a fire truck or the like, and more particularly to a power take-off apparatus in an automotive vehicle equipped with an automatic power transmission including a rotary element arranged to be driven by a prime mover of the vehicle when the power transmission is conditioned in a neutral position during stopping of the vehicle and to be arrested when the power transmission is conditioned in a forward position.

Such a conventional power take-off apparatus as described above comprises a drive gear mounted on the rotary element in the form of a clutch drum for rotation therewith, a driven gear arranged to be brought into meshing engagement with the drive gear during stopping of the vehicle, and an electrically operated shift mechanism including an electric motor and a linkage connected to the electric motor to move the driven gear toward and away from the drive gear in response to energization of the electric motor. In operation of the conventional power take-off apparatus, when the electric motor of the shift mechanism is energized in a condition where the power transmission is maintained in the forward position during stopping of the vehicle, the driven gear is brought into meshing engagement with the arrested drive gear. Thus, the output power of the prime mover is taken out through the gears when the power transmission is shifted to the neutral position. In such operation of the shift mechanism, it has been experienced that if the driven gear is not meshed with the drive gear, the electric motor must be energized to move the driven gear away from the drive gear, and also the power transmission must be shifted to the neutral position to rotate the drive gear. Thereafter, the power transmission is returned to the forward position, and subsequently the electric motor is energized to establish meshing engagement of the driven gear with the drive gear. It has been also experienced that if the electric motor is energized by an error in a condition where the power transmission is conditioned in the neutral position during stopping of the vehicle, the driven gear is moved toward the drive gear being driven by the output power of the prime mover. This causes undesired noises in meshing engagement of the gears.

SUMMARY OF THE INVENTION

It is, therefore, a primary object of the present invention to provide an improved power take-off apparatus wherein even if engaged with an end face of the drive gear in operation of the shift mechanism, the driven gear is meshed with the drive gear without causing any gear meshing noises in shifting operation of the power transmission to the neutral position, and wherein the electric motor can be energized only in a condition where the power transmission is maintained in the forward position.

According to the present invention, there is provided a power take-off apparatus wherein an electric control circuit is adapted to the electrically operated shift mechanism to effect energization of the electric motor when the power transmission is maintained in the forward position during stopping of the vehicle and to maintain the electric motor in its deenergized condition when the power transmission is shifted to the neutral position, and wherein the linkage of the shift mechanism is provided with resilient means for biasing the driven gear toward the drive gear when the former is engaged with an end face of the latter.

BRIEF DESCRIPTION OF THE DRAWINGS

Additional objects, features and advantages of the present invention will become readily apparent from the following detailed description of a preferred embodiment thereof when considered with reference to the accompanying drawings, in which:

FIG. 2 is a schematic illustration of a power take-off apparatus, an electric control apparatus and an idle-up mechanism which are adapted to the power transmission system shown in FIG. 1; and FIG. 3 illustrates an electric control circuit for the power take-off apparatus shown in FIG. 2.

DETAILED DESCRIPTION OF THE PREFERRED EMBODIMENT

Figure 1:
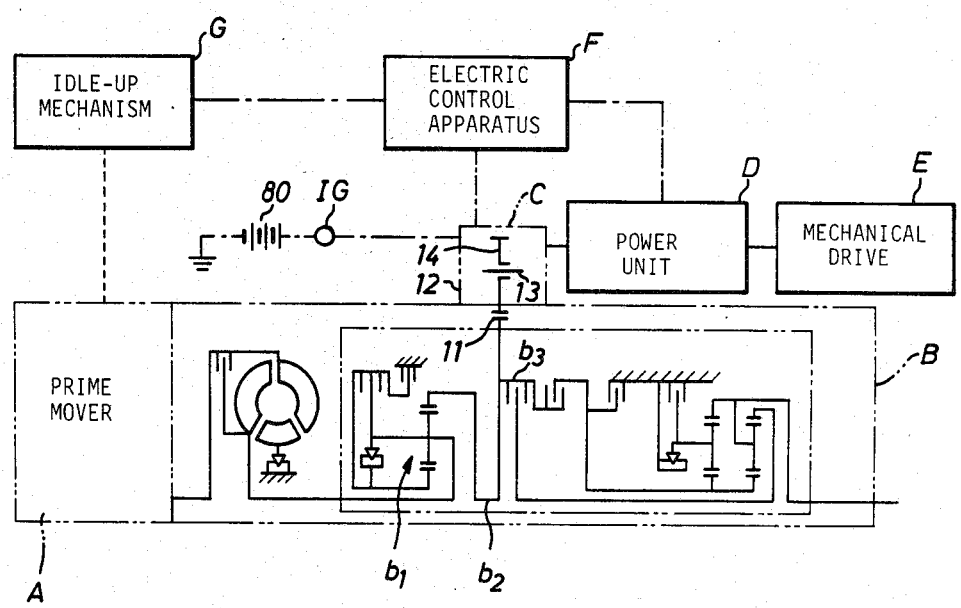
FIG. 1 is a schematic illustration of a power transmission system in a special-purpose vehicle.

Referring now to the drawings, particularly in FIG. 1, there is schematically illustrated a power transmission system in a special-purpose vehicle such as a dump truck, a fire truck, a cement mixer truck or the like. The power transmission system includes a prime mover A, an automatic power transmission B, a power take-off apparatus C for taking out an output power of the prime mover through the power transmission B, and a power unit D for transmitting the output power to a mechanical device E mounted on the vehicle. A control system for the power take-off apparatus C includes an electric control apparatus F for electrically controlling the power unit D during stopping of the vehicle, and an idle-up mechanism G for increasing the idling speed of the prime mover A.

As shown in FIGS. 1 and 2, the power take-off apparatus C comprises a drive gear 11 integrally mounted on the outer periphery of a clutch drum $b_3$, and a driven gear 14 axially slidably mounted on a support shaft 13 to be brought into meshing engagement with the drive gear 11 during stopping of the vehicle. the clutch drum $b_3$ is connected with an output shaft $b_2$ of a planetary gear unit $b_1$ which acts as an over-drive mechanism in the power transmission B. The support shaft 13 is carried on a casing 12 for the power take-off apparatus C. A shift fork 15 is fixedly mounted on a movable shaft 16 to move the driven gear 14 toward and away from the drive gear 11. The movable shaft 16 is axially slidably carried on the casing 12 and operatively connected to an electrically operated shift mechanism 20 which is activated under control of an electric control circuit 30. In the above arrangement, the clutch drum $b_3$ is conditioned to be driven by the prime mover A when the power transmission is shifted to a neutral or parking position during stopping of the vehicle and to be arrested when the power transmission B is shifted to a forward or reverse position.

The shift mechanism 20 includes an electric motor assembly 21 and an arm member 22 fixedly mounted on an output shaft of motor assembly 20 for rotation therewith. The arm member 22 is connected to the movable shaft 16 by means of a push-pull cable or rod 23 and a coil spring 24. As shown in FIG. 3, the motor assembly 21 includes an electric motor 21a, a conductive ring 21b arranged to be rotated by the motor 21a in a counterclockwise direction, and circumferentially spaced fixed contacts 21c, 21d and 21e. The fixed contact 21e is grounded. As shown in FIG. 2, the movable shaft 16 is associated with an electric indication circuit which includes a normally open switch 91 connected to an electric power source 80 in the form of a vehicle battery through an alarm lamp 92 and an ignition switch IG of the prime mover. When the switch 91 is closed by engagement with the movable shaft 16, the alarm lamp 92 is energized to indicate engagement of the driven gear 14 with the drive gear 11.

As shown in FIG. 3, the electric control circuit 30 includes a user actuable switch 31 of the normally open type, three relay switches 32, 33 and 34, and a position switch 35. The user actuable switch 31 is provided with a pilot lamp 31a and arranged to connect leading wires $L_1$ and $L_2$ to each other in its closed position. The relay switch 32 includes a moving coil 32a connected to a normally open parking brake switch 41, and a normally open contact 32b arranged between the leading wire $L_1$ and a leading wire $L_3$. The parking brake switch 41 is connected to the electric power source 80 through an indication lamp 42 and the ignition switch IG and is arranged to be closed when a parking brake of the vehicle is operated. When the parking brake switch 41 is closed, the indication lamp 42 is lighted, and the moving coil 32a is energized to close the contact 32b for effecting connection between the leading wires $L_1$ and $L_3$. The relay switch 33 includes a moving coil 33a connected to the leading wire $L_1$, and a pair of interlocked contacts 33b and 33c. During deenergization of the moving coil 33a, the contacts 33b and 33c are positioned to disconnect a leading wire $L_4$ from the leading wire $L_1$ and a leading wire $L_5$ and to connect the leading wire $L_5$ to the ground. When the moving coil 33a is energized, the interlocked contacts 33b and 33c are moved to connect the leading wire $L_1$ to the leading wire $L_5$ across the leading wire $L_4$. The relay switch 34 includes a moving coil 34a connected at its one end to the leading wire $L_2$ and grounded at its other end and a movable contact 34b connected to the leading wire $L_1$ through the moving coil 33a. During deenergization of the moving coil 34a, the movable contact 34b is positioned to connect the leading wire $L_1$ to a leading wire $L_6$. When the moving coil 34a is energized, the movable contact 34b is moved to connect the leading wire $L_1$ to a leading wire $L_7$. In addition, the leading wires $L_6$ and $L_7$ are respectively connected to the fixed contacts 21c and 21d of electric motor assembly 21.

The position switch 35 includes a movable contact 35a which is connected to the electric power source 80 through a leading wire $L_0$ and the ignition switch IG and arranged to be actuated in response to operation of the shift lever of the power transmission B. The position switch 35 further includes fixed contacts n and p connected to the electric control apparatus F through a leading wire $L_8$, a fixed contact r connected to an indication lamp 71 through a leading wire $L_9$, and a fixed contact d connected to the leading wire $L_3$. When the shift lever of power transmission B is maintained in its neutral position or parking position, the movable contact 35a is engaged with the fixed contact n or p to connect the electric control apparatus F to the electric power source 80 through the leading wires $L_8$ and $L_0$. When the shift lever of power transmission B is shifted to its forward position (D, 1 or 2), the movable contact 35a is engaged with the fixed contact d to connect the leading wire $L_3$ to the electric power source 80 through the leading wire $L_0$. When the shift lever of power transmission B is shifted to its reverse position, the movable contact 35a is engaged with the fixed contact r to energize the indication lamp 71.

As shown in FIG. 2, the idle-up mechanism G includes a rotary solenoid 51, an arm member 52 arranged to be angularly moved by energization of the rotary solenoid 51, and a wire 53 connected at its one end to the arm member 52 and at its other end to a lever 61 of an accelerator linkage 60. The rotary solenoid 51 is connected to a user actuable switch $F_1$ of the normally open type in the electric control apparatus F. When the user actuable switch $F_1$ is closed in a condition where the movable contact 35a of position switch 35 is maintained in engagement with the fixed contact n or p, the rotary solenoid 51 is energized to effect angular movement of the arm member 52. Thus, the accelerator linkage 60 is actuated by the angular movement of arm member 52 to increase the idling speed of the prime mover A. When the user actuable switch $F_1$ is opened, the rotary solenoid 51 is deenergized and moved to the original position by means of a return spring (not shown) acting thereon.

In operation, when the vehicle is parked with the shift lever in its forward position, the automatic power transmission B is conditioned to arrest the clutch drum $b_3$. In such a condition, the movable contact 35a of position switch 35 is engaged with the fixed contact d to connect the leading wire $L_3$ to the electric power source 80 through the leading wire $L_0$, and the parking brake switch 41 is closed to energize the moving coil 32a of relay switch 32. Thus, the contact 32b of relay switch 32 is closed to connect the leading wire $L_1$ to the electric power source 80 through the leading wires $L_3$ and $L_0$. When the user actuable switch 31 is closed and maintained in its closed position in the above-described condition, the leading wire $L_1$ is connected to the leading wire $L_2$ to energize the moving coil 34a of relay switch 34, and in turn, the movable contact 34b of relay switch 34 is moved to connect the leading wire $L_1$ to the leading wire $L_7$. Subsequently, the moving coil 33a of relay switch 33 is energized such that the inerlocked contacts 33b and 33c are moved to connect the leading wire $L_1$ to the leading wire $L_5$ through the leading wire $L_4$. Thus, the electric motor 21a is energized to rotate the conductive ring 21b counterclockwisely. When the conductive ring 21b is rotated by 180°, the fixed contact 21d is positioned in a recess in the conductive ring 21b to be disconnected from the fixed contact 21e. As a result, the fixed contact 21c is grounded through the fixed contact 21e, and the moving coil 33a of relay switch 33 is deenergized so that the interlocked contacts 33b and 33c are positioned to disconnect the leading wire $L_5$ from the leading wire $L_1$ thereby to deenergize the electric motor 21a.

During the counterclockwise rotation of the electric motor 21a, the arm member 22 of shift mechanism 20 is rotated by 180° to effect rightward movement of the movable shaft 16 through push-pull cable 23 and coil spring 24. Thus, the driven gear 14 on shaft 13 is shifted by the shift fork 15 of shaft 16 to be brought into meshing engagement with the drive gear 11. If the driven gear 14 may not be meshed with the drive gear 11, the former will be resiliently engaged with an end face of the latter under load of the coil spring 24 because the drive gear 11 is being still arrested. When the shift lever is shifted to its neutral or parking position from its forward position, the drive gear 11 is rotated by the output power applied thereto from the prime mover through the power transmission B and automatically meshed with the driven gear 14 to activate the power take-off apparatus C.

During activation of the power take-off apparatus C, the movable contact 35a of position switch 35 is engaged with the fixed contact n or p to disconnect the leading wire $L_3$ from the leading wire $L_0$ and to connect the electric control apparatus F to the electric power source 80 through leading wires $L_8$ and L hd 0. In such a condition, the idle-up mechanism G is activated by closing the user actuable switch $F_1$ in electric control apparatus F to increase the idling speed of the prime mover, and the power unit D is activated under control of the electric control apparatus F to drive the mechanical device E. When the user actuable switch $F_1$ in electric control apparatus F is opened, the idle-up mechanism G is deactivated to decrease the idling speed of the prime mover, and the power unit D is deactivated. Even if the user actuable switch 31 is operated by an error during activation of the power take-off apparatus C, the electric motor 21a will be maintained in its deenergized condition to prevent unexpected movement of the driven gear 14. If the shift lever is shifted to its forward or reverse position during activation of the power take-off apparatus C, the movable contact 35a of position switch 35 is positioned to disconnect the leading wire $L_8$ from the electric power source 80 so as to deactivate the electric control apparatus F. Thus, the idle-up mechanism G is automatically deactivated to decrease the idling speed of the prime mover so as to eliminate undesired shock in shifting operation of the power transmission.

When the user actuable switch 31 is opened in a condition where the shift lever of power transmission B is shifted to its forward position to arrest the drive gear 11, the moving coil 34a of relay switch 34 is deenergized so that the movable contact 34b is positioned to connect the leading wire $L_1$ to the leading wire $L_6$. Subsequently, the moving coil 33a of relay switch 33 is energized so that the interlocked contacts 33b and 33c are positioned to connect the leading wire $L_1$ to the leading wire $L_5$ through the leading wire $L_4$. Thus, the electric motor 21a is energized to effect counterclockwise rotation of the ring 21b. When the conductive ring 21b is rotated by 180°, the fixed contact 21c is positioned in the recess in conductive ring 21b to be disconnected from the fixed contact 21e. As a result, the fixed contact 21d is grounded through the fixed contact 21e, and the moving coil 33a of relay switch 33 is deenergized so that the interlocked contacts 33b and 33c are positioned to disconnect the leading wire $L_5$ from the leading wire $L_1$ thereby to deenergize the electric motor 21a. During the counterclockwise rotation of the electric motor 21a, the arm member 22 of drive mechanism 20 is rotated by 180° to effect leftward movement of the movable shaft 16 through the push-pull cable 23 and coil spring 24. Thus, the driven gear 14 is shifted by the shift fork 15 of shaft 16 leftward to be disengaged from the drive gear 11. When the parking brake is released to start the vehicle, the parking brake switch 41 is opened to deenergize the moving coil 32a of relay switch 32 so as to disconnect the leading wire $L_1$ from the leading wire $L_3$. In such a situation, the electric motor 21a is maintained in its deenergized condition even if the user actuable switch 31 is closed by an error. This is useful to prevent unexpected movement of the driven gear 14.

Although in the above embodiment the parking brake switch 41 is disposed within the power supply circuit for the relay switch 32, it may be replaced with a normally open switch which is closed when the vehicle is arrested. Furthermore, as shown in FIG. 3, the power supply circuit $L_3$ for the electric motor 21a may be provided with a timer relay switch T which is closed with a time delay after the movable contact 35a of position switch 35 is engaged with the fixed contact d. With such an arrangement of the time relay switch T, the drive gear 11 is completely arrested when the shift lever of power transmission B has been shifted to its forward position during activation of the power take-off apparatus.

Although a certain specific embodiment of the present invention has been shown and described, it is obvious that many modifications and variations thereof are possible in light of these teachings. It is to be understood, therefore, that within the scope of the appended claims, the invention may be practiced otherwise than as specifically described herein.

What is claimed is:

1. A power take-off apparatus in an automotive vehicle equipped wth an automatic power transmission including a rotary element arranged to be driven by a prime mover of the vehicle when the power transmission is maintained in a neutral position during stopping of the vehicle and to be arrested when the power transmission is maintained in a forward position, the power take-off apparatus comprising:

a drive gear mounted on the rotary element for rotation therewith;

a driven gear arranged to be brought into meshing engagement with said drive gear;

an electrically operated shift mechanism including an electric motor, and a linkage connected to said electric motor to move said driven gear toward and away from said drive gear in response to energization of said electric motor; and an electric control circuit for effecting energization of said electric motor when said power transmission is maintained in the forward position during stopping of the vehicle and for maintaining said electric motor in its deenergized condition when said power transmission is shifted to and maintained in the neutral position;

wherein the linkage of said shift mechanism is provided with resilient means for biasing said driven gear toward said drive gear when the former is being engaged with an end face of the latter.

2. A power take-off apparatus as claimed in claim 1, wherein said electric control circuit comprises:

first switch means arranged to be opened during travel of the vehicle and to be closed when the vehicle is arrested;

second switch means connected to said electric motor to effect energization of said electric motor when connected to an electric power source and to maintain said electric motor in its deenergized condition when disconnected from said electric power source; and third switch means connected to said second switch means to connect said second switch means to said electric power source through said first switch means when said power transmission is shifted to and maintain in the forward position and to disconnect said second switch means from said electric power source when said power transmission is conditioned in the neutral position.

3. A power take-off apparatus as claimed in claim 2, wherein said first switch means includes a parking brake switch of the normally open type connected at one end thereof with said electric power source and grounded at the other end thereof to be closed when a parking brake of the vehicle is operated, and a normally open relay switch interposed between said second and third switch means and connected at one end thereof with said electric power source and at the other end thereof with said parking brake switch to be energized in response to closing of said parking brake switch.

4. A power take-off apparatus as claimed in claim 2, wherein said second switch means comprises a user actuable switch of the normally open type, and relay switch means connected to said user actuable switch to effect energization of said electric motor in response to operation of said user actuable switch under control of said third switch means.

5. A power take-off apparatus as claimed in claim 2, wherein said third switch means is a position switch including a movable contact connected to said electric power source, a first fixed contact connected to said second switch means through said first switch means, and a second fixed contact connected to another electric control apparatus, said movable contact being arranged to be engaged with said first fixed contact when said power transmission is maintained in the forward position and to be engaged with said second fixed contact when said power transmission is shifted to and maintain in the neutral position.

* * * * *